(12) United States Patent
Kim et al.

(10) Patent No.: US 8,463,274 B2
(45) Date of Patent: Jun. 11, 2013

(54) RESOURCE ALLOCATION METHOD AND DEVICE

(75) Inventors: Ki Seok Kim, Gyeongju-si (KR); Jisoo Park, Daejeon (KR); Young-Il Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 292 days.

(21) Appl. No.: 12/686,088

(22) Filed: Jan. 12, 2010

(65) Prior Publication Data
US 2010/0248767 A1    Sep. 30, 2010

(30) Foreign Application Priority Data

Mar. 25, 2009  (KR) .................. 10-2009-0025584

(51) Int. Cl.
*H04W 36/00*    (2009.01)

(52) U.S. Cl.
USPC ............ 455/444; 455/443; 455/450; 455/454

(58) Field of Classification Search
USPC .................. 455/422.1, 450–453, 456.2, 464, 455/509, 510, 436–454; 370/395.41, 332, 370/328; 375/E7.141
See application file for complete search history.

(56) References Cited

U.S. PATENT DOCUMENTS

| | | | |
|---|---|---|---|
| 6,201,972 B1 | 3/2001 | Hamabe | |
| 8,032,142 B2 | 10/2011 | Carter et al. | |
| 2009/0325625 A1* | 12/2009 | Hugl et al. | 455/522 |
| 2010/0118996 A1* | 5/2010 | Sundaresan et al. | 375/260 |
| 2010/0222062 A1* | 9/2010 | Chou et al. | 455/449 |
| 2011/0116481 A1* | 5/2011 | Wang | 370/336 |
| 2011/0190003 A1* | 8/2011 | Hiltunen et al. | 455/452.1 |
| 2011/0223923 A1* | 9/2011 | Cho et al. | 455/448 |

FOREIGN PATENT DOCUMENTS

| | | |
|---|---|---|
| JP | 8-186866 | 7/1996 |
| JP | 11-275625 | 10/1999 |
| JP | 2009-10509 | 1/2009 |
| JP | 2010-518668 | 5/2010 |
| WO | 2008/093100 | 8/2008 |

* cited by examiner

*Primary Examiner* — Dominic E Rego
(74) *Attorney, Agent, or Firm* — Staas & Halsey LLP (57) ABSTRACT

The present invention relates a resource allocation method and a resource allocation device. According to an exemplary embodiment of the present invention, a resource allocation method of a wireless communication system includes: allocating a resource to a first base station; determining whether or not a second cell that is smaller than a first cell is provided in a first cell region managed by the first base station; reducing the resource allocated to the first base station when the second cell is provided; and allocating resources remaining after reducing the resource to a second base station that manages the second cell.

15 Claims, 7 Drawing Sheets

RESOURCE ALLOCATION METHOD AND DEVICE

CROSS-REFERENCE TO RELATED APPLICATION

This application claims priority to and the benefit of Korean Patent Application No. 10-2009-0025584 filed in the Korean Intellectual Property Office on Mar. 25, 2009, the entire contents of which are incorporated herein by reference.

BACKGROUND OF THE INVENTION (a) Field of the Invention

The present invention relates a resource allocation method and a resource allocation device.

(b) Description of the Related Art

In a wireless communication system, a base station performs an operation depending on a radio resource allocated during an initialization process of a system. Meanwhile, when a femto cell is included in a base station region, a resource for administrating the femto cell is required, but resources that the femto cell and the base station can exclusively share are limited.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a resource allocation method and a resource allocation device having advantages of dynamically reducing resources allocated to a base station and allocating redundant resources to a femto cell in a wireless communication system including a femto cell.

An exemplary embodiment of the present invention provides a resource allocation method of a wireless communication system that includes: allocating a resource to a first base station; determining whether or not a second cell smaller than a first cell is provided in a first cell region managed by the first base station; reducing the resource allocated to the first base station when the second cell is provided; and allocating resources remaining after reducing the resource to a second base station that manages the second cell.

The second cell may be a femto cell.

When the second cell is provided, the resource allocated to the first base station and the resource allocated to the second base station may be exclusive from each other.

The resource may include a frequency resource.

The resource may include a time resource.

The size of the resource allocated to each of the first base station and the second base station may depend on the number of second cells.

Allocating the resource to the first base station includes allocating a resource set during initialization of a system to the first base station, wherein the resource is constituted by a resource for downlink and a resource for uplink.

When the second cell is not provided, the downlink resource and the uplink resource may not be allocated to the second base station Allocating the resource to the second base station includes dividing the downlink section of the frame at least into a first downlink section and a second downlink section, dividing the uplink section of the frame at least into a first uplink section and a second uplink section, reducing the resource so as to allocate the first downlink section and the first uplink section to the first base station, and allocating the second downlink section and the second uplink section to the second base station.

Another embodiment of the present invention provides a resource allocation device that includes: a determination unit that determines whether or not a second cell smaller than a first cell is provided in a first cell region managed by the first base station in a wireless communication system; and an allocation unit that allocates the resource to a first base station or a second base station depending on the determination in the determination unit.

The allocation unit may allocate the resource to the first base station, and when the second cell is provided, the allocation unit may reduce the resource allocated to the first base station and allocate the reduced resource to the second base station.

When the second cell is provided, the resources allocated to the first base station and the second base station may be exclusive from each other.

The resource may include a frequency resource.

The resource may include a time resource

The second cell may be a femto cell.

According to an embodiment of the present invention, resources can be efficiently allocated in a wireless communication system in which a base station and a femto cell coexist.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, a resource allocation method according to an exemplary embodiment of the present invention will be described in detail with reference to the accompanying drawings.

Figure 1:
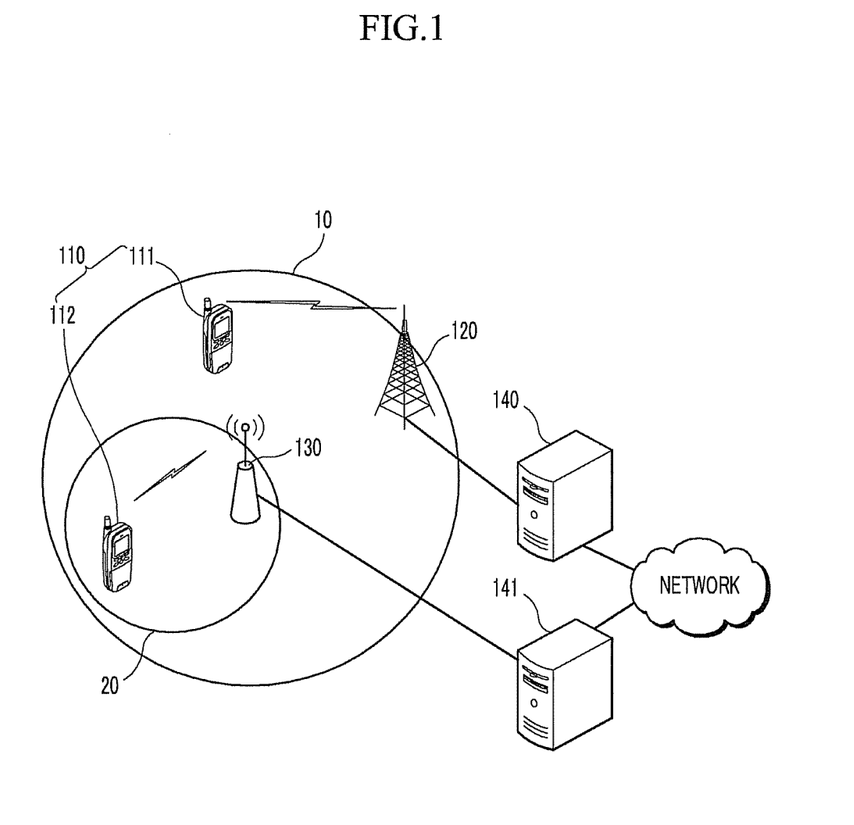
FIG. 1 is a diagram illustrating a wireless communication system according to an exemplary embodiment of the present invention.

FIG. 1 is a diagram illustrating a wireless communication system according to an exemplary embodiment of the present invention.

Referring to FIG. 1, the wireless communication system includes a terminal 110, a base station (BS) 120, a femto base station 130, and access control routers (ACR) 140 and 141.

The terminal 110, as an endpoint of a radio channel, accesses the base station 120 or the femto base station 130, and transmits and receives high-speed packet data by using a transmitting/receiving function and a medium access control (MAC) processing function in accordance with a wireless access standard of the wireless communication system, i.e., a portable Internet system.

The terminal 110 includes a first terminal 111 that accesses the base station 120 and a second terminal 112 that accesses the femto base station 130.

The base station 120 receives a wireless signal from the terminal 110, and transmits the wireless signal to the access control router 140 or converts data received from the access control router 140 into the wireless signal and transmits the wireless signal to the terminal 110. The base station 120 performs an initial access to the terminal 110, an intersection handover control function, and a quality of service (QoS) control function.

The base station 120 receives frame information corresponding to a frequency resource and a time resource from the access control router 140 and sets and administrates the frame information as a system parameter of the base station 120 during an initialization process of the system. The base station 120 broadcasts the information into a base station region 10, that is, a macro cell managed by the base station 120, such that the firs terminal 111 shares resource information.

The femto base station 130 is a miniaturized base station that provides a wireless communication service to, for example, a region within a 10 m radius, and manages a femto cell 20 that, for example, is installed in a shadow area in which macro cell radio waves are deteriorated, such as a home or the inside of a building, to secure the quality of a mobile communication service. Herein, the femto base station 130 and the femto cell 20 are terms that are not limited to a dictionary definition of femto, and include a miniaturized base station and a miniaturized cell range having a name of a unit larger or smaller than the femto base station 130 and the femto cell 20.

As such, when the femto cell 20 is included, a separate frequency band (i.e., FA2) other than a frequency band (i.e., FA1) supporting the base station 120 needs to be allocated to the femto base station 130 in order to remove an interference phenomenon between the femto cell 20 and the base station 10. However, a predetermined frequency band is limited or the frequency resource may be inefficiently utilized.

The access control routers 140 and 141 transmit the data received from the base station 120 and the femto base station 130 to an upper node of the wireless communication system, and transmit the data received from the upper node to the base station 120 and the femto base station 130. Further, the access control routers 140 and 141 provide the system parameter to the base station 120 and the femto base station 130 during initialization of the base station 120 and the femto base station 130. Meanwhile, in general, the system parameter may be set and administrated similarly in a neighboring base station 120 and the femto base station 130, and in some cases, the system parameter may be administrated by allocating different frequency bands and frequency bandwidths. The variable system parameter is set by the access control routers 140 and 141.

Meanwhile, two access control routers 140 and 141 are connected to each other through a network.

Hereinafter, referring to FIG. 2, the access control routers will be described in detail.

Figure 2:
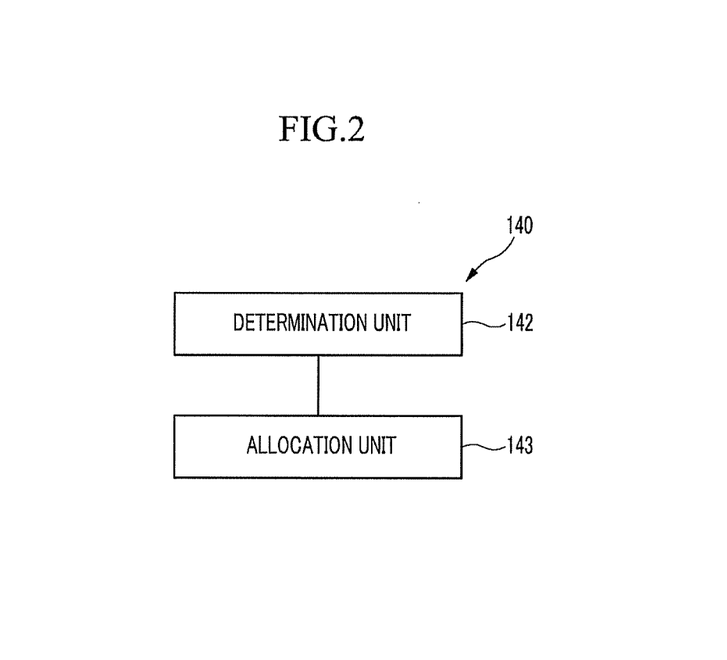
FIG. 2 is a block diagram illustrating an access control router according to an embodiment of the present invention.

FIG. 2 is a block diagram illustrating an access control router according to an embodiment of the present invention.

Referring to FIG. 2, the access control router includes a determination unit 142 and an allocation unit 143.

The determination unit 142 determines whether or not the femto cell 20 is included in the wireless communication system.

The allocation unit 143 allocates a resource to the base station 120. When the determination unit 142 determines that the femto cell 20 is included in the base station region 10, the allocation unit 143 reduces the resource allocated to the base station 120 and allocates the reduced resource to the femto base station 130. As a result, in this case, the resource allocated to the base station 120 and the resource allocated to the femto base station 130 are exclusive from each other.

As such, by dynamically allocating the limited resources, it is possible to reduce the interference phenomenon between the base station region 10 and the femto cell 20.

Hereinafter, referring to FIGS. 3 to 5, wireless resource allocation according to an exemplary embodiment of the present invention will be described in detail.

Figure 3:
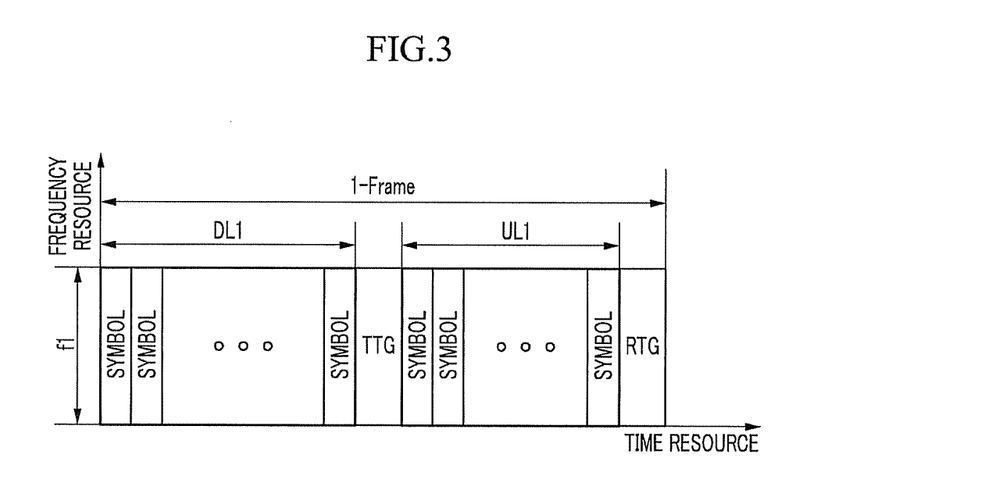
FIG. 3 is a diagram illustrating resource allocation of a base station when no femto cell is provided according to an exemplary embodiment of the present invention.
Figure 4:
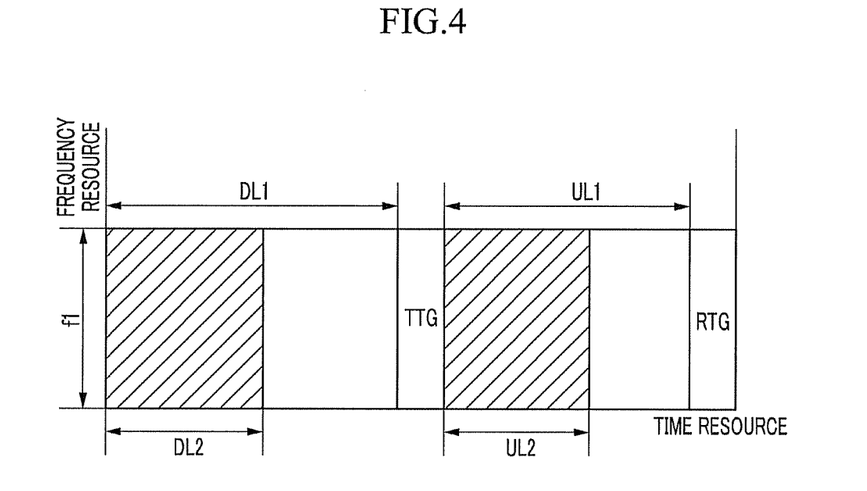
FIG. 4 is a diagram illustrating resource allocation of a base station when a femto cell is provided according to an exemplary embodiment of the present invention.
Figure 5:
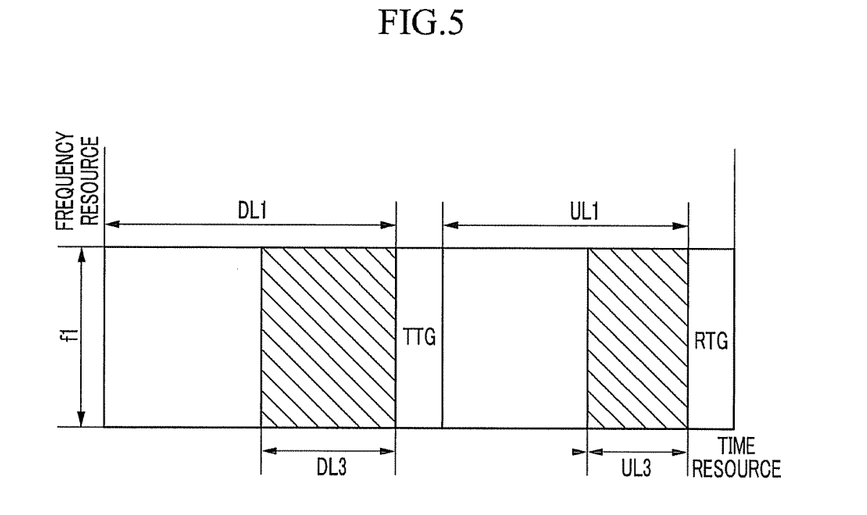
FIG. 5 is a diagram illustrating resource allocation of a femto base station when a femto cell is provided according to an exemplary embodiment of the present invention.

FIG. 3 is a diagram illustrating resource allocation of a base station in a time division duplexing (hereinafter referred to as "TDD") system when no femto cell is provided according to an exemplary embodiment of the present invention, FIG. 4 is a diagram illustrating the resource allocation of the base station when the femto cell is provided according to an exemplary embodiment of the present invention, and FIG. 5 is a diagram illustrating the resource allocation of a femto base station when the femto cell is provided according to an exemplary embodiment of the present invention.

Referring to FIG. 3, the resource according to the embodiment of the present invention generally includes a frequency resource and a time resource. The frequency resource includes a predetermined frequency band (f1) allocated to the base station 120, a frequency bandwidth, a sector, a sub-channel, etc., and the time resource includes a plurality of symbols. In the TDD wireless communication system, one frame includes a downlink (DL) section and an uplink (UL) section so as to perform bidirectional communication. The downlink (DL) section and the uplink (UL) section may be separated from each other with a transmit/receive transition gap (TTG) and a receive/transmit transition gap (RTG) interposed therebetween. A downlink section DL1 and an uplink section UL1 have the same frequency band f1, and use different times by TDD. In this case, when the femto cell 20 is not included, the base station 120 can use both the downlink section DL1 and uplink section UL1.

Referring to FIG. 4, when the femto cell 20 is included, the base station 120 uses a downlink section DL2 and an uplink section UL2, and time resources allocated to the downlink section DL2 and the uplink section UL2 are some of time resources allocated to the downlink section DL1 and the uplink section UL1, respectively, when no femto cell is provided. The base station 120 transmits data to the first terminal 111 in the downlink section DL2, and the base station 120 receives the data from the first terminal 111 in the uplink section UL2.

Referring to FIG. 5, when the femto cell 20 is included in the wireless communication system, the femto base station 130 uses a downlink section DL3 and an uplink section UL3, and time resources allocated to the downlink section DL3 and the uplink section UL3 are parts of the time resources allocated to the downlink section DL1 and the uplink section UL1, respectively, when no femto cell is provided. Further, the time resources allocated to the downlink section DL3 and the uplink section UL3 of the femto base station 130 are exclusive with respect to the time resources allocated to the downlink section DL2 and the uplink section UL2 of the base station 120. The femto base station 130 transmits the data to the second terminal 112 in the downlink section DL3, and the femto base station 130 receives the data from the second terminal 112 in the uplink section UL3.

Meanwhile, when the femto cell 20 is included in the wireless communication system, the size of the time resource allocated to each of the base station 120 and the femto base station 130 may depend on the number of femto cells 20.

Hereinafter, referring to FIGS. 6 to 8, wireless resource allocation according to another embodiment of the present invention will be described in detail.

Figure 6:
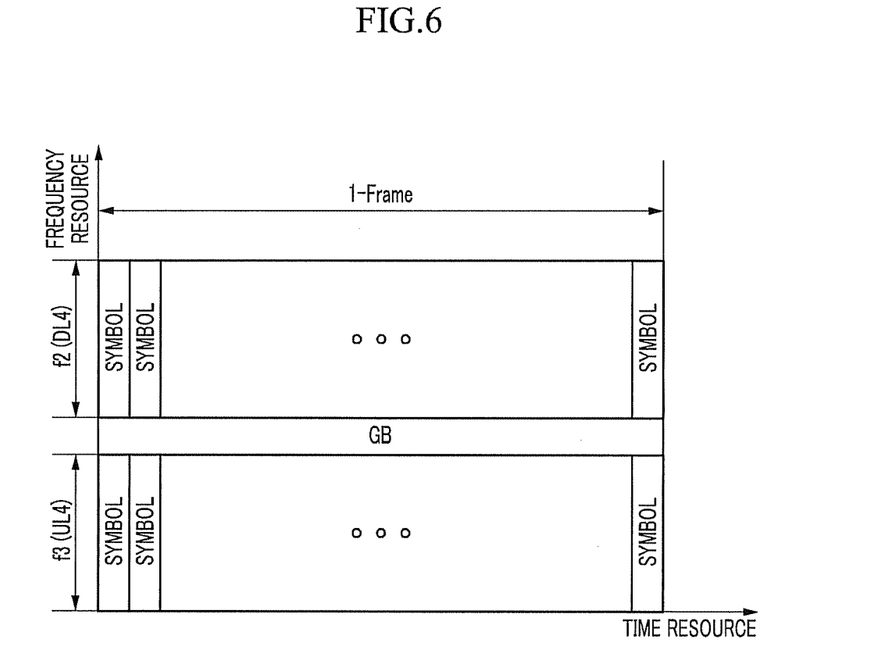
FIG. 6 is a diagram illustrating resource allocation of a base station when no femto cell is provided according to another embodiment of the present invention.
Figure 7:
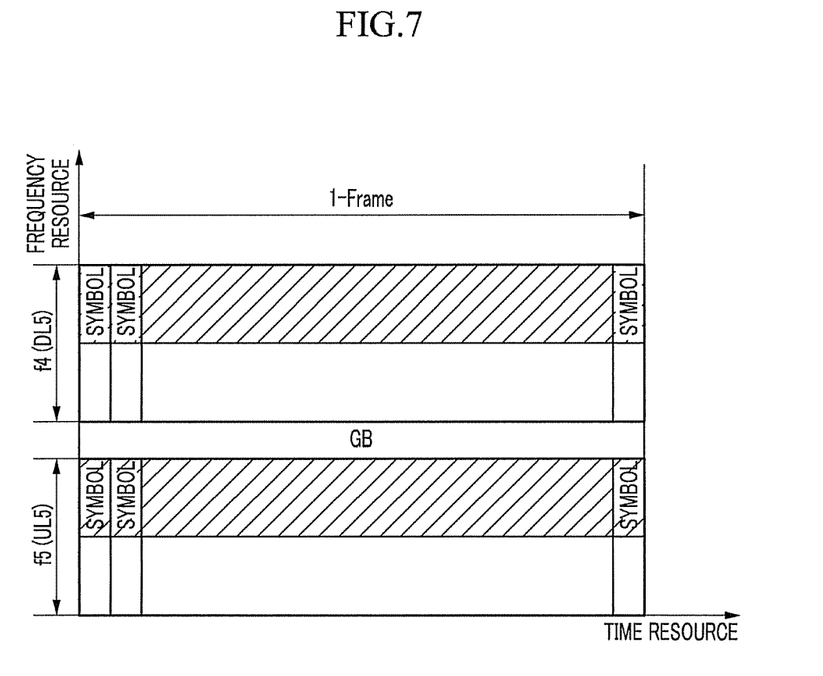
FIG. 7 is a diagram illustrating resource allocation of a base station when a femto cell is provided according to another embodiment of the present invention.
Figure 8:
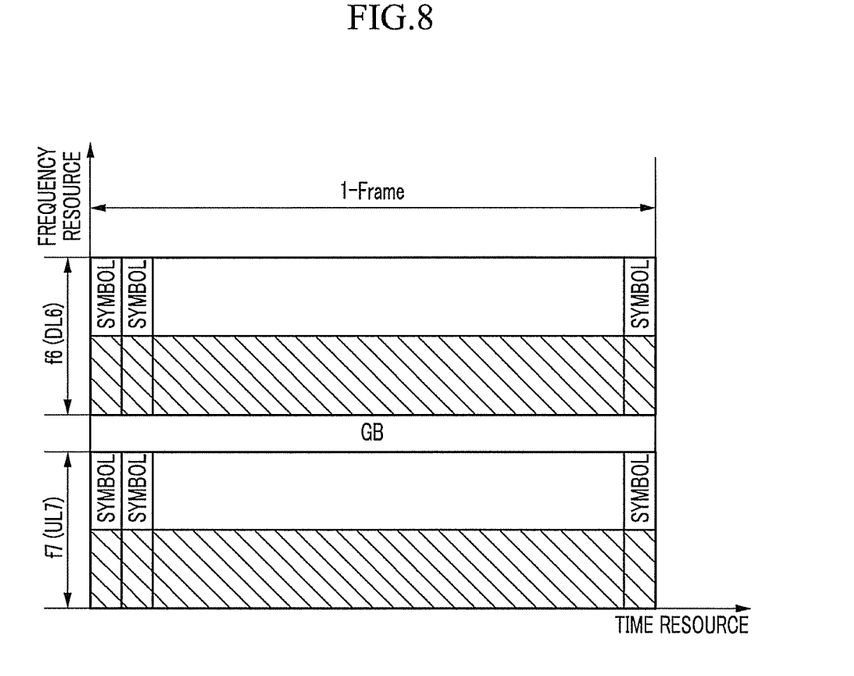
FIG. 8 is a diagram illustrating resource allocation of a femto base station when a femto cell is provided according to another embodiment of the present invention.

FIG. 6 is a diagram illustrating resource allocation of a base station in a frequency division duplexing (hereinafter referred to as "FDD") system when no femto cell is provided according to another embodiment of the present invention, FIG. 7 is a diagram illustrating the resource allocation of the base station when the femto cell is provided according to another embodiment of the present invention, and FIG. 8 is a diagram illustrating the resource allocation of a femto base station when the femto cell is provided according to another embodiment of the present invention.

Referring to FIG. 6, a downlink section DL4 and an uplink section UL4 use different frequency bands f2 and f3 for the same time. The downlink section DL4 and the uplink section UL4 may be separated from each other with a guard band (GB) interposed therebetween. In this case, when the femto cell 20 is not included, the base station 120 can use both the downlink section DL4 and the uplink section UL4.

Referring to FIG. 7, when the femto cell 20 is included in the wireless communication system, a downlink section DL5 and an uplink section UL5 between the base station 120 and the first terminal 111 use different frequency bands f4 and f5 for the same time, depending on FDD. At this time, the frequency bands f4 and f5 allocated to the downlink section DL5 and the uplink section UL5 between the femto base station 130 and the terminal 110, respectively, are parts of the frequency bands f2 and f3 allocated to the downlink section DL4 and the uplink section UL4 between the base station 120 and the terminal 110.

Referring to FIG. 8, when the femto cell 20 is included in the wireless communication system, a downlink section DL6 and an uplink section UL6 between the femto base station 130 and the second terminal 112 use different frequency bands f6 and f7 for the same time. At this time, the frequency bands f4 and f5 allocated to the downlink section DL6 and the uplink section UL6 of the femto base station 130 are parts of the frequency bands f2 and f3 allocated to the downlink section DL4 and the uplink section UL4 when no femto cell is provided. Further, the frequency resources f6 and f7 allocated to the downlink section DL6 and the uplink section UL6 of the femto base station 130 are exclusive with respect to the frequency resources f4 and f5 allocated to the downlink section DL5 and the uplink section UL5 of the base station 120.

Meanwhile, when the femto cell 20 is included in the wireless communication system, the size of the frequency resource allocated to each of the base station 120 and the femto base station 130 may depend on the number of femto cells 20.

Meanwhile, although not shown, when the femto cell 20 is included in the wireless communication system, the frequency resource even in the TDD system and the time resource and both the frequency resource and the time resource even in the FDD system may be exclusive with respect to the frequency resource and the time resource allocated to the femto base station 130.

Hereinafter, a wireless resource allocation method according to an exemplary embodiment of the present invention will be described in detail with reference to FIG. 9.

Figure 9:
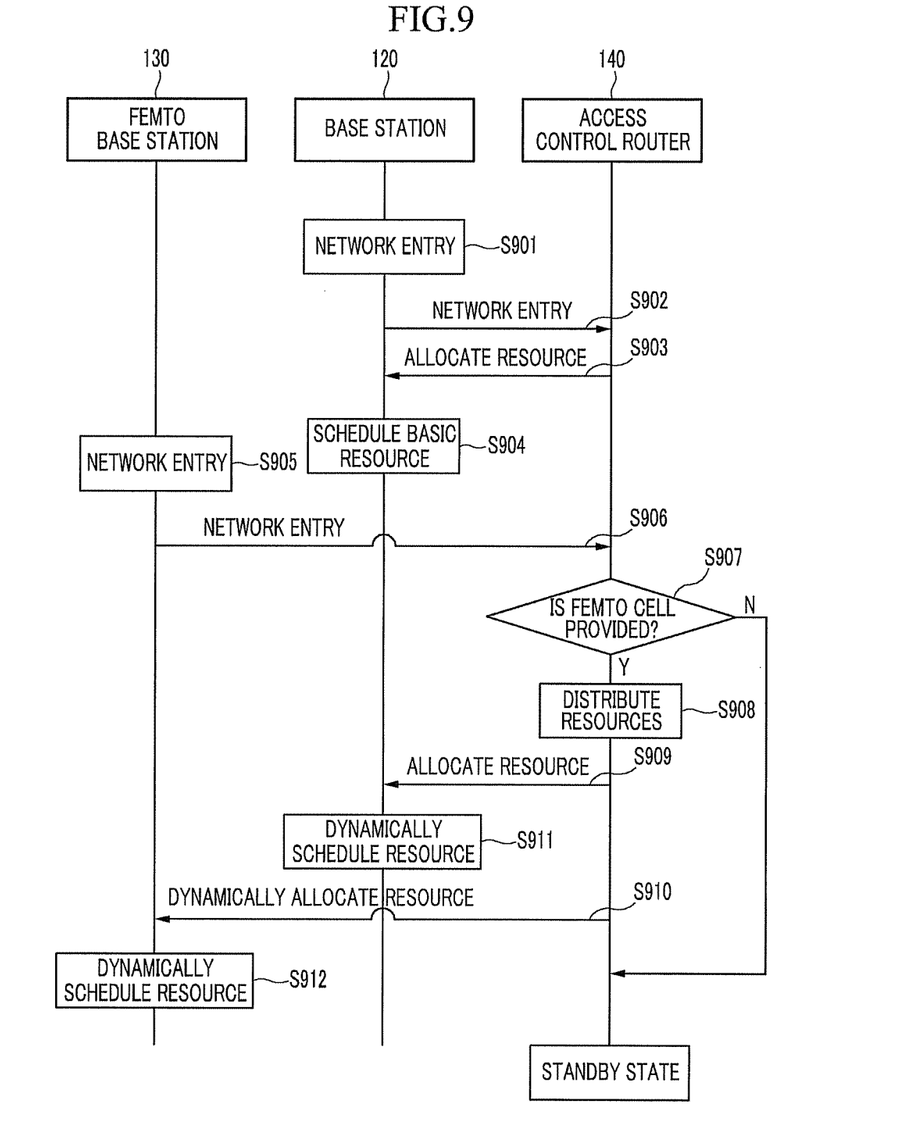
FIG. 9 is a flowchart illustrating a sequence of a resource allocation method according to an exemplary embodiment of the present invention.

FIG. 9 is a flowchart illustrating a sequence of a resource allocation method according to an exemplary embodiment of the present invention.

Referring to FIG. 9, when the base station 120 is included in the network (S901), information indicating that the base station 120 is included in the network is transmitted to the access control router 140 (S902). Therefore, the access control router 140 allocates the resource to the base station 120 (S903). For example, the access control router 140 can allocate the resource as shown in FIG. 3 or 6. As a result, the base station 120 sets the allocated resource as an administration resource and communicates with the terminal 111 by scheduling the resource (S907).

Thereafter, when the femto base station 130 enters the network (S905), information indicating that the femto base station 130 is included in the network is transmitted to the access control router 140 (S906).

Therefore, the access control router 140 verifies whether or not the femto cell 20 is provided in the base station region 10 (S907), and when the femto cell 20 is provided in the base station region 10, the access control router 140 distributes the resources by considering the femto cell 20 (S908) and allocates the resource to the base station 120 on the basis of the distributed resources (S909). Further, the base station 120 allocates to the femto base station 130 a resource that is exclusive of the resource allocated to the base station 120 (S910). That is, the resource allocated to the base station 120 is dynamically reduced, and the reduced resource is allocated to the femto base station 130. For example, the resource can be allocated as shown in FIGS. 4 and 5 or FIGS. 7 and 8. As a result, the base station 120 and the femto base station 130 set the allocated resources as the administration resource and communicate with the terminal 110 by scheduling the resources (S911 and S912). At this time, the resource allocation of the access control router 140 may be dynamically varied depending on the number of femto cells 20.

When it is determined that no femto cell is provided, the access control router 140 is subjected to a standby state.

The resource allocation method according to the embodiment of the present invention can be adopted in various communication systems including an orthogonal frequency division multiplexing (OFDM) system.

The above-mentioned exemplary embodiments of the present invention are not implemented only by the device and method, but may be implemented by a program that can realize functions corresponding to components of the exemplary embodiment of the present invention or a recording medium in which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resource allocation method of a wireless communication system, comprising:
   allocating a resource to a first base station;
   determining whether or not one or more second cells that are smaller than a first cell is provided in a first cell region managed by the first base station;
   reducing the resource allocated to the first base station when the second cells are provided responsive to a number of second cells which use a same resources; and
   allocating resources remaining after reducing the resource to one or more second base stations that manage the second cells,
   wherein allocating the resource to the first base station comprises allocating a downlink section of a frame to the first base station, and allocating an uplink section of the frame to the first base station,
   wherein, when the second cell is not provided, the downlink section and the uplink section are not allocated to the second base station.

2. The method of claim 1, wherein the second cell is a femto cell.

3. The method of claim 1, wherein, when the second cell is provided, the resource allocated to the first base station and the resource allocated to the second base station are exclusive from each other.

4. The method of claim 1, wherein the resource comprises a frequency resource.

5. The method of claims 4, wherein the resource comprises a time resource.

6. The method of claim 5, wherein the resource allocated to each of the first base station and the second base station depends on the number of second cells.

7. The method of claims 1, wherein the resource comprises a time resource.

8. A resource allocation method of a wireless communication system, comprising:
   allocating a resource to a first base station;
   determining whether or not a second cell that is smaller than a first cell is provided in a first cell region managed by the first base station;
   reducing the resource allocated to the first base station when the second cell is provided; and
   allocating resources remaining after reducing the resource to a second base station that manages the second cell,
   wherein allocating the resource to the first base station comprises allocating a downlink section of a frame to the first base station, and allocating an uplink section of the frame to the first base station,
   wherein, when the second cell is not provided, the downlink section and the uplink section are not allocated to the second base station,
   wherein allocating the resource to the second base station comprises:
   dividing the downlink section of the frame at least into a first downlink section and a second downlink section;
   dividing the uplink section of the frame at least into a first uplink section and a second uplink section;
   reducing the resource so as to allocate the first downlink section and the uplink section to the first base station; and
   allocating the second downlink section and the second uplink section to the second base station.

9. A resource allocation device, comprising:
   a determination unit that determines whether or not one or more second cells that are smaller than a first cell is provided in a first cell region managed by the at base station in a wireless communication system; and
   an allocation unit that allocates the resource to the first base station and a second base station depending on the determination of the determination unit by reducing the resource allocated to the first base station responsive to a number of second cells which use a same resources,
   wherein allocating the resource to the first base station comprises allocating a downlink section of a frame to the first base station, and allocating an uplink section of the frame to the first base station,
   wherein, when the second cell is not provided, the downlink section and the uplink section are not allocated to the second base station.

10. The device of claim 9, wherein the allocation unit allocates the resource to the first base station, and when the second cell is provided, the allocation unit reduces the resource allocated to the first base station and allocates resources remaining after reducing the resource to the second base station.

11. The device of claim 10, wherein when the second cell is provided, the resources allocated to the first base station and the second base station are exclusive from each other.

12. The device of claim 9, wherein the resource comprises a frequency resource.

13. The device of claim 12, wherein the resource comprises a time resource.

14. The device of claim 9, wherein the resource comprises a time resource.

15. The device of claim 9, wherein the second cell is a femto cell.

* * * * *